US006720078B1

(12) United States Patent
Isizuka et al.

(10) Patent No.: US 6,720,078 B1
(45) Date of Patent: Apr. 13, 2004

(54) ORGANIC COMPOSITE COATED ZINC-BASED METAL PLATED STEEL SHEET

(75) Inventors: Kiyokazu Isizuka, Hyogo (JP); Hidetoshi Shindou, Hyogo (JP); Teruaki Yamada, Hyogo (JP); Kimitaka Hayashi, Hyogo (JP); Ikuo Kikuchi, Hyogo (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 10/129,701

(22) PCT Filed: Nov. 9, 2000

(86) PCT No.: PCT/JP00/07870

§ 371 (c)(1),
(2), (4) Date: Sep. 23, 2002

(87) PCT Pub. No.: WO01/34873

PCT Pub. Date: May 17, 2001

(30) Foreign Application Priority Data

Nov. 9, 1999 (JP) .......................................... 11-318439

(51) Int. Cl.[7] .......................... B32B 27/38; B32B 15/08

(52) U.S. Cl. ....................... 428/418; 428/413; 428/341; 428/626

(58) Field of Search ................................ 428/551, 553, 428/554, 555, 556, 557, 559, 560, 561, 562, 615, 621, 624, 626, 212, 213, 219, 340, 341, 413, 414, 416, 418

(56) References Cited

U.S. PATENT DOCUMENTS

| | | | | |
|---|---|---|---|---|
| 6,509,099 B1 * | 1/2003 | Urata et al. | .............. | 428/423.1 |
| 6,537,674 B1 * | 3/2003 | Hamahara et al. | .......... | 428/447 |
| 6,623,868 B1 * | 9/2003 | Shindou et al. | ............. | 428/659 |

FOREIGN PATENT DOCUMENTS

| | | |
|---|---|---|
| JP | 8-13154 | 1/1996 |
| JP | 8-277434 | 10/1996 |
| JP | 11-302862 | 11/1999 |

* cited by examiner

*Primary Examiner*—Robert Dawson
*Assistant Examiner*—Michael J Feely
(74) *Attorney, Agent, or Firm*—Wenderoth, Lind & Ponack, L.L.P.

(57) ABSTRACT

The present invention aims at provision of an organic composite galvanized steel sheet having its characteristics such as corrosion resistance and workability improved. Thus, the present invention provides an organic composite galvanized steel sheet that is formed by sequentially depositing on a surface of a steel sheet a galvanization layer, a zinc phosphate layer containing Mg, and an organic layer, and is characterized in that a value of Mg/P (weight ratio) in the zinc phosphate layer is 0.15 or larger and an amount of Mg contained in the zinc phosphate layer is 20 mg/m$^2$ or more. Preferably, the zinc phosphate layer contains one or two or more of Ni, Mn, Co, Fe, Cu, Al, and Ca. In one preferred embodiment, the organic layer is formed as a composite layer containing an organic resin and one or two kinds or more of powder or colloid selected from $SiO_2$, $Al_2O_3$, MgO, $Fe_2O_3$, $Fe_3O_4$, $ZrO_2$, $TiO_2$, and $SnO_2$.

16 Claims, 1 Drawing Sheet

ORGANIC COMPOSITE COATED ZINC-BASED METAL PLATED STEEL SHEET

TECHNICAL FIELD

The present invention relates to galvanized steel sheets intended for use in applications such as automobiles, electric household appliances and building materials and having improved characteristics including corrosion resistance and workability.

TECHNICAL BACKGROUND

Traditionally, galvanized steel sheets for use in applications such as automobiles, electric household appliances, and building materials are in many cases subjected to phosphate treatment, chromate treatment and organic coating treatment prior to their use in order to impart properties such as corrosion resistance and workability and thereby improve their value. In view of the effect that they may impose to the environment, the chromate-treated steel sheets have become less favored as they may contain chromium (VI), and demands are increasing for phosphate treatments. Zn—Ni alloy-plated steel sheets are widely in use because of their high corrosion resistance and workability. However, containing Ni, the alloy plating leads to an increased manufacturing costs. For these reasons, attempts have been made to apply phosphate treatments to less costly electrogalvanized steel sheets, hot-dip galvanized steel sheets, or alloy hot-dip galvanized steel sheets to thereby improve their value.

However, when electrogalvanized steel sheets, hot-dip galvanized steel sheets, or alloy hot-dip galvanized steel sheets are subjected to phosphate treatments in a conventional manner, the resulting workability is not as significant as that of Zn—Ni alloy-plated steel sheets. In addition, these steel sheets exhibit a lower corrosion resistance as compared to organic composite steel sheets, which are formed by depositing chromate layer and an organic layer over Zn—Ni alloy plating. Steel sheets including a phosphate layer and an organic layer formed over the phosphate layer are also known. These steel sheets have not been put to practical use, however, since the organic layer tends to become too thick if sufficient corrosion resistance is pursued. These steel sheets are also associated with problems concerning weldability, workability, and costs.

DISCLOSURE OF THE INVENTION

Accordingly, it is an objective of the present invention to provide a galvanized steel plate that has overcome the above-identified problems and has its characteristics, such as corrosion resistance and workability, improved without being subjected to chromate treatments.

In an effort to improve performances of the phosphate-treated galvanized steel sheets, including corrosion resistance and workability, the present inventors have examined the possibility of forming an additional organic layer on top of a phosphate layer. However, it has tuned out that any combination of conventional treatments cannot provide sufficient adhesion between the phosphate layer and the organic layer and is likely to result in formation of blisters upon electrodeposition of the coating layer. Accordingly, no significant improvement is expected in the corrosion resistance or the workability. In the course of their studies to find a way to solve these problems, the present inventors have discovered that highly favorable characteristics are achieved by treating a surface of a galvanized steel sheet with zinc phosphate that contains Mg as an essential component and by forming an organic layer on top of the zinc phosphate layer, and have thereby completed the present invention.

In one aspect, the present invention provides an organic composite galvanized steel sheet formed by sequentially depositing on at least one surface of a steel sheet, a galvanization layer, a zinc phosphate layer in an amount of 0.3 $g/m^2$ or more, and an organic layer in an amount of 0.3 to 2 $g/m^2$. The organic composite galvanized steel sheet is characterized in that the zinc phosphate layer contains Mg so that the value of Mg/P (weight ratio) in the zinc phosphate layer is 0.15 or larger and the amount of Mg contained in the zinc phosphate layer is 20 $mg/m^2$ or more. Preferably, the zinc phosphate layer contains one or two or more of Ni, Mn, Co, Fe, Cu, Al, and Ca. In one preferred embodiment, the organic layer is formed as a composite layer containing an organic resin and one or two kinds or more of powder or colloid selected from $SiO_2$, $Al_2O_3$, MgO, $Fe_2O_3$, $Fe_3O_4$, $ZrO_2$, $TiO_2$, and $SnO_2$.

The galvanization for use in the present invention is not limited to a particular type and may be pure zinc galvanization or alloy galvanization. In either case, significant improvements in the corrosion resistance and workability can be realized. However, electrogalvanization, hot-dip galvanization, and alloy hot-dip galvanization are preferred in view of manufacturing costs. Also, the galvanization may be applied as a single-layered plating or a multi-layered plating, or it may be a galvanization layer deposited on a pre-plating of Ni, Cu and the like.

It is essential that the zinc phosphate layer deposited on the galvanization layer contain Mg. This constitutes one of the key features of the present invention. The amount of Mg is at least 0.15 as measured in the value of Mg/P (weight ratio). If this value is smaller than 0.15, the corrosion resistance is not improved. The upper limit of this value is typically about 0.78 though not particularly limited, and it is difficult to have the zinc phosphate layer contain Mg in larger amounts. By forming a zinc phosphate layer containing Mg in the aforementioned ratio, adhesion to the organic layer deposited on top of the zinc phosphate layer is significantly improved and formation of blisters upon electrodeposition of the layer is effectively prevented. Although underlying mechanisms for these phenomena have not been fully understood, it is guessed that the presence of Mg enhances the flexibility of the zinc phosphate layer to prevent occurrence of cohesive failure in the zinc phosphate layer and reduces its solubility under basic environments. Mg is also known to have a significant ability to stabilize corroded products of Zn and thus suppresses progress of corrosion, contributing to improvements in the corrosion resistance.

The amount of Mg in the zinc phosphate layer needs to be 20 $mg/m^2$ or more in order to achieve a high corrosion resistance. Aside from Mg, the zinc phosphate layer preferably contains one or two or more of Ni, Mn, Co, Fe, Cu, Al, and Ca. This further improves the corrosion resistance and workability.

The zinc phosphate layer has a weight of 0.3 $g/m^2$ or more, preferably in a range from 0.3 $g/m^2$ to 2 $g/m^2$. The weight less than the lower limit of this range may lead to an insufficient corrosion resistance, whereas the weight exceeding the upper limit makes the layer susceptible to peeling when it is subjected to strict working processes.

A preferred treatment solution for forming the zinc phosphate layer is prepared as a bath by adding a large amount of magnesium nitrate to a commercially available treatment solution containing Zn ions and phosphate ions as principal components and optionally containing metal ions other than Zn, nitrate ions, fluorides and the like. The amount of Mg and the ratio of Mg to P in the layer can be controlled by adjusting the amount of magnesium nitrate to be added, and the coating amount of the zinc phosphate layer can be adjusted by varying treatment time.

According to the present invention, sufficient performances are achieved without using the treatment known as chromate sealing, which generally follows the zinc phosphate treatment.

With regard to the organic layer, it may be composed solely of an organic resin while it is preferably formed as a composite layer composed of an organic resin, and one or two kinds or more of powder or colloid selected from $SiO_2$, $Al_2O_3$, MgO, $Fe_2O_3$, $Fe_3O_4$, $ZrO_2$, $TiO_2$, and $SnO_2$ in view of corrosion resistance. The organic layer may also contain a wax component, a color pigment, a rust-preventing agent and the like. The wax component permits working without applying oil depending on conditions of the shaping processes. Considering the fact that at present epoxy coatings are widely in use as an electrodeposition coating in automobile steel sheet application, an epoxy resin is preferred because of its compatibility with the electrodeposition coating and its ability to ensure close adherence, while no particular limitation is imposed on the type of the organic resin.

The coating amount of the organic layer is in a range of 0.3 $g/m^2$ to 2 $g/m^2$. The coating amount less than the lower limit of the range results in insufficient improvements in the workability, whereas the coating amount exceeding the upper limit of the specified range leads to a reduced weldability. When applied to outer plates of automobiles, the organic layer is applied there so that the coating amount is different on each side of the plate, for example, less than 0.3 $g/m^2$, or preferably zero, on the outer side of the plate and 0.3 $g/m^2$ to 2 $g/m^2$ on the inner side of the plate, since the organic layer makes the electrodeposition appearance of the outer side of the outer plates unattractive when applied in excessive amounts. In this manner, most well-balanced characteristics are achieved.

When intended for use as outer plates of automobiles, the organic composite galvanized steel sheet preferably includes layers with the below-described constructions deposited on the inner side and on the outer side of the plate, respectively.

(Inner Side)

A galvanization layer, a zinc phosphate layer in an amount of 0.3 $g/m^2$ or more, and an organic layer in an amount of 0.3 $g/m^2$ to 2 $g/m^2$ are sequentially deposited. The zinc phosphate layer contains Mg so that the value of Mg/P (weight ratio) is 0.15 or larger and the amount of Mg is 20 $mg/m^2$ or more in the zinc phosphate layer.

(Outer Side)

A galvanization layer, a zinc phosphate layer in an amount of 0.3 $g/m^2$ or more, and an organic layer in an amount of 0.3 $g/m^2$ or less are sequentially deposited. The zinc phosphate layer contains Mg so that the weight ratio of Mg to P is 0.15 or larger and the amount of Mg is 20 $mg/m^2$ or more in the zinc phosphate layer. The organic layer may be 0 $g/m^2$, or not at all provided, on the outer side.

Figure 1:
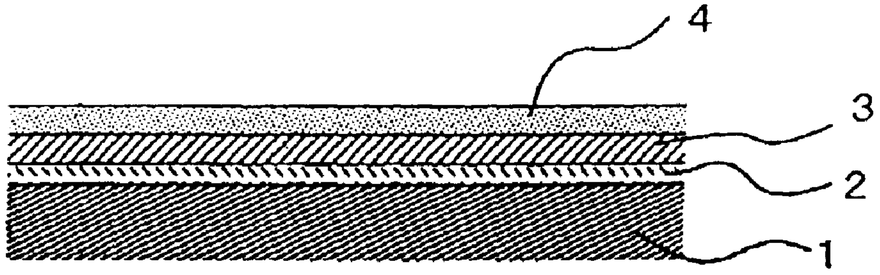
FIG. 1 is a schematic cross-section of a steel sheet of the present invention showing one side of the steel sheet.

Reference Numerals:

1 steel sheet, 2 galvanization layer, 3 zinc phosphate layer, and 4 organic layer.

BEST MODE FOR CARRYING OUT THE INVENTION

While examples of the present invention are described in the following, they are not intended to limit the scope of the invention in any way.

EXAMPLES

A 0.7 mm thick electrogalvanized steel sheet with the r-value (Lankford value) of 1.9, which had been plated on each side to a Metsuke amount (basis weight) of 30 $g/m^2$ (each side), was used for each sample sheet.

Examples 1 Through 10, and Comparative Examples 1 Through 5

Zinc Phosphate Treatment

The sample sheets were surface-conditioned (with Pl-Zn manufactured by NIHON PAKERIZING Co., Ltd.) on both sides. To a zinc phosphate treatment solution manufactured by NIHON PARKERIZING Co., Ltd. (0.7 g/l Zn ions, 2.0 g/l Ni ions, 6.5 g/l Phosphate ions, 6 g/l nitrate ions, and 0.2 g/l fluorides), magnesium nitrate hexahydrate was added to various concentrations ranging from 0 to 30 g/l as measured in the concentration of Mg ions to prepare a treatment bath. The sample sheets were treated in the bath on both sides. Using the spray technique, the coating amount (on each side) was adjusted by varying the treatment time from 1 to 10 seconds.

Deposition of Organic Layer

An aqueous resin was prepared by blending into a vinyl-modified epoxy ester resin, a block isocyanate hardener, a modified polyethylene wax, and a condensed azo red pigment (proportions of solid content of each component are 100:10:5:3, respectively). To the aqueous resin, colloidal silica was added to an amount of 16% by weight of solid content to form a coating. Using a roll coater, the coating was applied to the sample sheets on both sides to a dry coating weight of 0 to 2.5 $g/m^2$ (on each side) while controlling the rotation speed. The sheets were baked to 150° C. to fix the coating and were then cooled by water.

Performance Evaluation

The amounts of Mg and P in the zinc phosphate layer were determined by the ICP analysis by completely dissolving the layer. Assuming that zinc phosphate was present in the form of the Hopeit structure, the amount of the zinc phosphate layer was calculated from the amount of P.

The amount of the organic layer was determined by first quantifying Si by the X-ray fluorescent analysis and converting the composition of the organic layer into the amount of the layer.

Corrosion resistance was determined as follows: the sample sheets were rinsed with a commercially available rinsing oil and were worked to form a U-shaped bead (width of sample=70 mm, BHF=1 ton, height of shaped part=70 mm, R of punch used to form bead=5 mm, R of die used to form bead=3 mm, R of punch=5 mm, R of die=5 mm, working speed=25 spm). A small piece was cut out from the side portion (on the die-side) of each sample sheet and degreased. A strip of cellophane tape was applied to the end surfaces and the opposite surface of each sample piece. The sample pieces were then subjected to the CCT test. After 10 cycles, the degree of rusting was observed. Ratings were given on a scale of A, B, C and D; where A=0%, B=less than 1%, C=1 to 10%, and D=more than 10%. Conditions for the CCT test: spray with salt water (5% NaCl, 35) for 6 hours→dry (50° C., 45%RH) for 3 hours→place under moist environment (50° C., 95%RH) for 14 hours→dry (50° C., 45%RH) for 1 hour. This cycle was repeated.

Workability was determined as the maximum height to which a sheet can project when shaped using a ball head punch (with a bead). Conditions for working are as follows: BHF=3 tons, punch=40 mmΦ, 40 R, blank=98 mmΦ. Ratings were given on a scale of A, B, C and D; where A=more than 17.0 mm, B=16.5 to 17.0 mm, C=16.0 to 16.5 mm, and D=less than 16.0 mm.

ED appearance was determined as follows: each sample piece was treated with a commercially available alkali degreasing solution (pH=10.5, 40° C., immersed for 1 min) and was then subjected to a chemical conversion treatment for automobiles (SURFDINE 2500MZL manufactured by NIPPON PAINT Co., Ltd.). Subsequently, a coating for automobiles was applied to the sample pieces through cationic electrodeposition (V20 manufactured by NIPPON PAINT Co., Ltd., 20$\mu$, baked at 170° for 20 min). The appearance of the sample pieces was visually observed, and ratings were given on a scale of A, B, C and D; where A=very good, B=good, C=moderately uneven, and D=poor.

Coating adhesion was evaluated as follows: each sample piece was treated with a commercially available alkali degreasing solution (pH=10.5, 40° C., immersed for 1 min) and was then subjected to a chemical conversion treatment for automobiles (SURFDINE 2500MZL manufactured by NIPPON PAINT Co., Ltd.). Subsequently, a coating for automobiles was applied to the sample pieces through cationic electrodeposition (V20 manufactured by NIPPON PAINT Co., Ltd., 20$\mu$, baked at 170° for 20 min). The sample pieces were left for one whole day and night and were then immersed in warm water at 50° C. for 10 days. After the immersion period, the sample pieces were taken out of water and cuts were made on the coating in a grid-like pattern with spacing of 1 mm. Each sample piece was then stripped of coating with a strip of cellophane tape. Ratings were made on a scale of A, B, C and D; where A=% stripped area was 0%, B=% stripped area was less than 5%, C=% stripped area was between 5% and 50%, and D=% stripped area was more than 50%.

Weldability was determined by using a Cu—Cr CF-type electrode chip (5 mmΦ) and measuring the optimum range of applied current with a welding pressure of 200 kgf and weld time of 13 cycles. Ratings were made on a scale of A, B, C and D; where A=more than 1.5 kA, B=1.0 to 1.5 kA, C=0.3 to 1.0 kA, and D=less than 0.3 kA.

The results of the evaluation are shown in Table. 1. As can be seen, Examples of the present invention each showed improved characteristics whereas Comparative Examples, each of which lies outside the range of the present invention, had some of the performances reduced.

TABLE 1

| No | Zinc phosphate layer: Mg amount (mg/m$^2$) | Zinc phosphate layer: Mg/P (wt ratio) | Zinc phosphate layer: Coating amount (g/m$^2$) | Organic Layer: coating amount (g/m$^2$) | Corrosion resistance | Workability | ED appearance | Coating adhesion | Weldability |
|---|---|---|---|---|---|---|---|---|---|
| Ex. | | | | | | | | | |
| 1 | 21 | 0.31 | 0.5 | 0.5 | A | A | B | A | A |
| 2 | 55 | 0.30 | 1.3 | 0.5 | A | A | B | A | A |
| 3 | 92 | 0.30 | 2.3 | 0.5 | A | A | B | A | B |
| 4 | 46 | 0.55 | 0.6 | 0.5 | A | A | B | A | A |
| 5 | 60 | 0.21 | 2.2 | 0.5 | A | A | B | A | B |
| 6 | 32 | 0.15 | 1.6 | 0.5 | A | A | B | A | A |
| 7 | 55 | 0.30 | 1.3 | 1 | A | A | B | A | B |
| 8 | 55 | 0.30 | 1.3 | 1.5 | A | A | B | A | B |
| 9 | 55 | 0.30 | 1.3 | 1.8 | A | A | B | A | B |
| 10 | 55 | 0.30 | 1.3 | 0.3 | A | A | B | A | A |
| Comp. Ex. | | | | | | | | | |
| 1 | 0 | 0 | 1.9 | 0.5 | D | C | B | B | B |
| 2 | 2 | 0.02 | 0.9 | 0.5 | D | B | B | B | A |
| 3 | 9 | 0.47 | 0.1 | 0.5 | D | B | C | D | B |
| 4 | 55 | 0.30 | 1.3 | 0 | C | C | A | A | A |
| 5 | 55 | 0.30 | 1.3 | 2.5 | A | A | C | A | D |

Examples 11 Through 13, and Comparative Examples 6 and 7

An organic layer was independently deposited on each side of the zinc phosphate-treated steel sheet obtained in Example 2 in the same manner as described in Example. The coating amount of the organic layer on each side was adjusted as shown in Table. 2. In the table, for example, "0/0.5" indicates that the organic layer was not provided on the outer side and was coated only on the inner side to the amount of 0.5 g/m$^2$.

Evaluation was made in the same manner as in Examples except that only outer sides were evaluated for ED appearance and only inner sides were evaluated for corrosion resistance. Workability was tested in both cases where the outer side faces the die and where the inner side faces the die. While ED appearance was evaluated in the same manner as described above, the sample was rated as "OK" when it was determined to be of a sufficient level to be used in the outer sides of outer plates of automobiles, and the sample was rated as "NG" when determined to be of an insufficient level for use in outer sides.

The results of the evaluation are shown in Table 2. As can be seen, Examples of the present invention each showed improved characteristics, whereas Comparative Examples, each of which lies outside the range of the present invention, had some of the performances reduced.

TABLE 2

| No | Zinc phosphate layer Mg amount ($mg/m^2$) | Mg/P (wt ratio) | Coating amount ($g/m^2$) | Organic layer coating amount ($g/m^2$) outer side/inner side | ED appearance evaluated on outer side | Corrosion resistance evaluated on inner side | Workability Outer side facing a die | Inner side facing a die |
|---|---|---|---|---|---|---|---|---|
| Ex. | | | | | | | | |
| 11 | 55 | 0.30 | 1.3 | 0/0.5 | OK | A | A | B |
| 12 | 55 | 0.30 | 1.3 | 0/1.0 | OK | A | A | B |
| 13 | 55 | 0.30 | 1.3 | 0/1.5 | OK | A | A | B |
| Comp. Ex. | | | | | | | | |
| 6 | 55 | 0.30 | 1.3 | 0.3/0.5 | NG | A | A | A |
| 7 | 55 | 0.30 | 1.3 | 0.5/0 | NG | C | B | A |

Industrial Applicability

The present invention enables provision of galvanized steel sheets that have their characteristics, such as corrosion resistance and workability, improved, without using chromate treatments. Not only can the steel sheets of the present invention be produced in a simple manner, but they are also cost-efficient and are suitable for use in various applications such as automobiles, home electric appliances, and building materials.

What is claimed is:

1. An organic composite galvanized steel sheet formed by sequentially depositing on at least one surface of a steel sheet a galvanization layer, a zinc phosphate layer in an amount of 0.3 $g/m^2$ or more, and an organic layer in an amount of 0.3 to 2 $g/m^2$, characterized in that the zinc phosphate layer contains Mg so that a value of Mg/P (weight ratio) in the zinc phosphate layer is 0.15 or larger and an amount of Mg contained in the zinc phosphate layer is 20 $mg/m^2$ or more.

2. The organic composite galvanized steel sheet according to claim 1, characterized in that the zinc phosphate layer contains one or two or more of Ni, Mn, Co, Fe, Cu, Al, and Ca.

3. The organic composite galvanized steel sheet according to claim 2, characterized in that a weight of the organic layer on one surface of the steel sheet is from 0.3 to 2 $g/m^2$ and a weight of the organic layer on the other surface of the steel sheet is less than 0.3 $g/m^2$ or 0 $g/m^2$.

4. The organic composite galvanized steel sheet according to claim 2, characterized in that the organic resin is an epoxy resin or a modified epoxy resin.

5. The organic composite galvanized steel sheet according to claim 4, characterized in that a weight of the organic layer on one surface of the steel sheet is from 0.3 to 2 $g/m^2$ and a weight of the organic layer on the other surface of the steel sheet is less than 0.3 $g/m^2$ or 0 $g/m^2$.

6. The organic composite galvanized steel sheet according to claim 2, characterized in that the organic layer is formed as a composite layer containing an organic resin and one or two kinds or more of powder or colloid selected from $SiO_2$, $Al_2O_3$, MgO, $Fe_2O_3$, $Fe_3O_4$, $ZrO_2$, $TiO_2$, and $SnO_2$.

7. The organic composite galvanized steel sheet according to claim 6, characterized in that a weight of the organic layer on one surface of the steel sheet is from 0.3 to 2 $g/m^2$ and a weight of the organic layer on the other surface of the steel sheet is less than 0.3 $g/m^2$ or 0 $g/m^2$.

8. The organic composite galvanized steel sheet according to claim 6, characterized in that the organic resin is an epoxy resin or a modified epoxy resin.

9. The organic composite galvanized steel sheet according to claim 8, characterized in that a weight of the organic layer on one surface of the steel sheet is from 0.3 to 2 $g/m^2$ and a weight of the organic layer on the other surface of the steel sheet is less than 0.3 $g/m^2$ or 0 $g/m^2$.

10. The organic composite galvanized steel sheet according to claim 1, characterized in that the organic layer is formed as a composite layer containing an organic resin and one or two kinds or more of powder or colloid selected from $SiO_2$, $Al_2O_3$, MgO, $Fe_2O_3$, $Fe_3O_4$, $ZrO_2$, $TiO_2$, and $SnO_2$.

11. The organic composite galvanized steel sheet according to claim 10, characterized in that a weight of the organic layer on one surface of the steel sheet is from 0.3 to 2 $g/m^2$ and a weight of the organic layer on the other surface of the steel sheet is less than 0.3 $g/m^2$ or 0 $g/m^2$.

12. The organic composite galvanized steel sheet according to claim 10, characterized in that the organic resin is an epoxy resin or a modified epoxy resin.

13. The organic composite galvanized steel sheet according to claim 12, characterized in that a weight of the organic layer on one surface of the steel sheet is from 0.3 to 2 $g/m^2$ and a weight of the organic layer on the other surface of the steel sheet is less than 0.3 $g/m^2$ or 0 $g/m^2$.

14. The organic composite galvanized steel sheet according to claim 1, characterized in that the organic resin is an epoxy resin or a modified epoxy resin.

15. The organic composite galvanized steel sheet according to claim 14, characterized in that a weight of the organic layer on one surface of the steel sheet is from 0.3 to 2 $g/m^2$ and a weight of the organic layer on the other surface of the steel sheet is less than 0.3 $g/m^2$ or 0 $g/m^2$.

16. The organic composite galvanized steel sheet according to claim 1, characterized in that a weight of the organic layer on one surface of the steel sheet is from 0.3 to 2 $g/m^2$ and a weight of the organic layer on the other surface of the steel sheet is less than 0.3 $g/m^2$ or 0 $g/m^2$.

* * * * *